United States Patent [19]

Carobolante et al.

[11] Patent Number: 5,592,345
[45] Date of Patent: Jan. 7, 1997

[54] FEEDFORWARD CIRCUIT AND METHOD FOR CONTROLLING THE SPEED OF A SPINDLE MOTOR IN A DISK DRIVE

[75] Inventors: Francesco Carobolante, Portola Valley, Calif.; Sandro Cerato, Merate, Italy

[73] Assignee: SGS-Thomson Microelectronics, Inc., Carrollton, Tex.

[21] Appl. No.: 347,277

[22] Filed: Nov. 30, 1994

[51] Int. Cl.⁶ ............................ G11B 15/46; G11B 21/02
[52] U.S. Cl. .......................................... 360/73.03; 360/75
[58] Field of Search ............................. 360/73.01, 73.03, 360/75

[56] References Cited

U.S. PATENT DOCUMENTS

| | | | |
|---|---|---|---|
| 4,669,004 | 5/1987 | Moon et al. | 360/73.03 |
| 4,789,975 | 12/1988 | Taniyama | 360/73.03 |
| 5,126,689 | 6/1992 | Nakamura | 360/67 |
| 5,184,257 | 2/1993 | Koga et al. | 360/77.05 |
| 5,204,594 | 4/1993 | Carobolante | 318/254 |
| 5,301,072 | 4/1994 | Wilson | 360/77.01 |
| 5,473,230 | 12/1995 | Dann et al. | 360/73.03 |

FOREIGN PATENT DOCUMENTS 3155383  7/1991  Japan.

*Primary Examiner*—Aristotelis Psitos
*Assistant Examiner*—Regina Y. Neal
*Attorney, Agent, or Firm*—Joseph C. Arrambide; Theodore E. Galanthay; Robert Groover

[57] ABSTRACT

The invention is used in a disk drive and comprises a feedforward circuit connected between the head position circuit and the speed control loop circuit. The feedforward circuit precompensates the speed control loop for changes in rotation drag due to movements in the head of a disk drive. The feedforward circuit may include one or more deadband amplifiers and may include filter circuit. The invention disclose the method for controlling the speed of a spindle motor in a disk drive which includes the step of precompensating the speed control loop circuit with a processed head positioning signal.

20 Claims, 2 Drawing Sheets

FEEDFORWARD CIRCUIT AND METHOD FOR CONTROLLING THE SPEED OF A SPINDLE MOTOR IN A DISK DRIVE

BACKGROUND OF THE INVENTION

1. Field of the Invention

This invention relates to improvements in controlling the speed of direct current motors in disk drives and more specifically to improvements in controlling the speed of direct current motors used in disk drives which have moving heads, and more specifically to a feedforward circuit and method which precompensates the speed control loop circuit for changes in drag on the motor due to head seeks.

2. Description of the Relevant Art

The problem addressed by this invention is encountered in the disk drive industry where the accuracy of rotational speed is increasingly important. The trend in the industry has been to increase the storage capacity and the accuracy of the disk drive while reducing the weight and power consumption. Consequently, drive manufacturers have increased the density of data on a disk in a disk drive while decreasing the inertial and rotational mass of the disk drive; therefore, the need for controlling the speed of a drive to a high degree of accuracy while minimizing jitter is becoming of paramount importance, especially in high density small package disk drives such as those used in the portable computer market. An additional trend in the industry is to decrease the average seek time for the disk drive. The decrease in seek time is typically accomplished by simply increasing the acceleration and deceleration of the read/write heads (r/w heads).

One problem in small disk drives is the fact that the position of the head will affect the drag on the rotating media. It has been observed that the rotational drag created by the heads is approximately proportional to the radial distance the heads are from the center of rotation. Consequently, the rotating media will either speed up or slow down when a head seek occurs because the drag on the motor changes, and because the speed control loop is often too slow, due to its low bandwidth, to compensate for the changes in drag. This problem is exacerbated as head seek times are decreased since the change in drag will occur much quicker. Additionally, as the inertial and rotational mass of the disk drive continues to decrease, the rotational drag on the media becomes a more significant factor to overcome. Therefore, one problem in small hard drives is the fact that the position of the head will affect drag and therefore affect the speed regulation of the spindle motor.

Referring now to FIG. 1, a disk drive system according to the prior art is shown. FIG. 1 shows the pertinent part of a head positioning circuit 10, which includes a voice coil motor digital to analog converter (VCM DAC) 12, a transconductance amplifier 14, a voice coil motor (VCM) 16, and read/write heads 18. In operation, a head position signal is generated by the control unit of the disk drive (not shown) and applied to the VCM DAC 12 on line 11. The VCM DAC 12 converts the head position signal into an analog signal which amplifier 14 converts into current for the VCM 16, which is mechanically coupled to the heads 18 of the disk drive. The r/w heads 18 move responsive to the current in the VCM 16, as is known in the art. The operation of head positioning circuits are further discussed in U.S. Pat. No. 5,297,024 and is fully incorporated hereinto by reference.

FIG. 1 also shows a speed control loop 20 which controls the speed of the spindle motor 30. In operation, the speed control loop 20 maintains the speed of the spindle motor 30 by comparing a feedback signal 21 to a reference signal in the FLL or PLL detector 22. From the comparison, an error signal is fed to the charge pump 24 which integrates the error signal. The integrated error signal is filtered by filter 26 and then converted to current by amplifier 28. The output of amplifier 28 is used to drive the stator coils of spindle motor 30. If the spindle motor is running too slow, the FLL or PLL detector 22 will sense the error and increase the output of charge pump 24. This increased output is sensed by the amplifier 28 which increases the drive current to the stator windings of the spindle motor 30 so that the spindle motor 30 speeds up. Conversely, if the motor is running too fast, the FLL or PLL detector 22 senses the extra speed and decreases the output of the charge pump 24 appropriately. Consequently, amplifier 28 will reduce the current to the stator windings of the spindle motor which will slow the motor. The method and apparatus for controlling the speed of a spindle motor in a disk drive is discussed in U.S. Pat. No. 5,223,772 and U.S. Pat. No. 5,204,594 and U.S. Pat. No. 5,293,445 and U.S. Pat. No. 5,329,560 and are fully incorporated into this specification by reference.

As discussed above, the problem with the prior art circuit is that changes in the position of the heads can affect the rotational velocity of the spindle motor. It has been observed that the bandwidth of the speed control loop 20 is typically too slow to compensate for speed variations due to head seeks.

SUMMARY OF THE INVENTION

Therefore, it is an object of the invention to precompensate for the drag for the changes in torque due to head seeks in a disk drive.

It is further an object of this invention to anticipate changes in rotational drag due to changes in head position.

It is further an object of the invention to provide a feed forward control of a spindle motor to cancel the effects of head seeks.

These and other objects, features, and advantages of the invention will be apparent to those skilled in the art from the following detailed description of the invention, when read in conjunction with the accompanying drawings and appended claims.

The invention includes a method and a circuit for precompensating a speed control loop circuit of a disk drive for the changes in rotational drag due to changes in position of the heads in the disk drive. The method includes the steps of sensing the head positioning circuit and feedforwarding the sensed voltage to the speed control loop circuit. The feedforward circuit includes one or more deadband amplifiers and can include a filter circuit.

DETAILED DESCRIPTION OF THE PREFERRED EMBODIMENT

Figure 1:
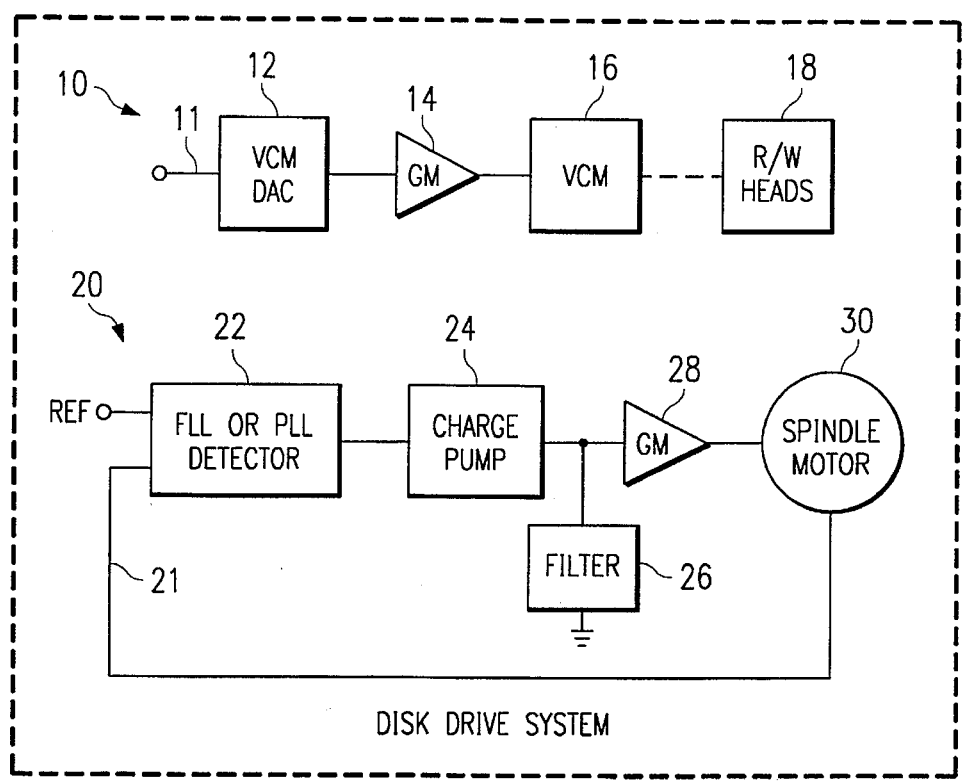
FIG. 1 is a block diagram of a head position circuit of a disk drive and a block diagram of a speed control circuit of a disk drive, as known in the prior art.
Figure 2:
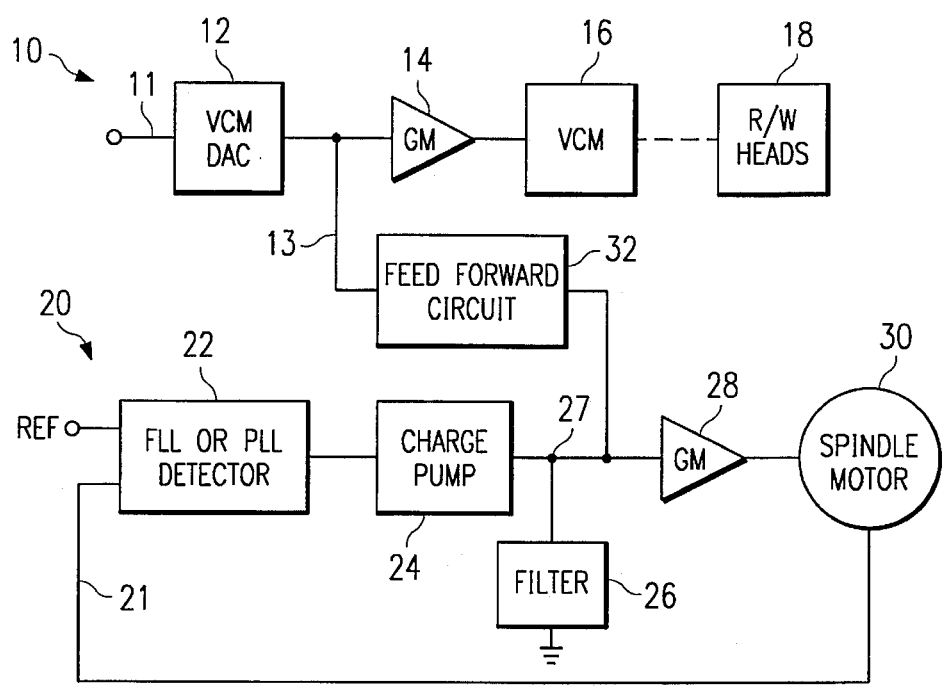
FIG. 2 is a block diagram of a feedforward circuit connecting the head position circuit to a speed control circuit in a disk drive.

Referring to FIG. 2, a disk drive system according to the preferred embodiment is shown and will now be described. FIG. 2 shows the pertinent part of a head positioning circuit 10, which includes a voice coil motor digital to analog converter (VCM DAC) 12 connected to a transconductance amplifier 14, which in turn is connected to a voice coil motor (VCM) 16, physically connected to read/write heads 18. In operation, a head position signal is generated by the control unit of the disk drive (not shown) and received by the VCM DAC 12 on line 11. The VCM DAC 12 converts the head position signal into an head control signal 13 which amplifier 14 converts into current for the VCM 16, which is mechanically coupled to the r/w heads 18 of the disk drive. The r/w heads 18 move responsive to the current in the VCM 16, as is known in the art.

FIG. 2 also shows a speed control loop 20 which controls the speed of the spindle motor 30. The speed control loop 20 consists of a FLL or PLL detector which has a reference signal input, a feedback loop input, and an output which is connected to an input for a charge pump 24. The charge pump 24 has an output which is connected to a filter 26 and an input to amplifier 28. The amplifier 28 has an output which is connected to a spindle motor 30. The spindle motor has a position indicator, such as a zero crossing detector, which is used as a feedback signal. The feedback signal is sent to the FLL or PLL detector 22 via feedback line 21.

In operation, the speed control loop 20 maintains the speed of the spindle motor 30 by comparing the feedback signal on line 21 to the reference signal in the FLL or PLL detector 22. From the comparison, an error signal is fed to the filter 26 which integrates the error signal. The integrated error signal is then converted to current by amplifier 28. The output of amplifier 28 is used to drive the stator coils of spindle motor 30. If the spindle motor 30 is running slower than desired, the FLL or PLL detector 22 will sense the error and increase the output of filter 26. This increase is sensed by the amplifier 28 which increases the drive current in spindle motor 30 so that the motor speeds up. Conversely, if the motor is running fast, the FLL or PLL detector 22 senses the extra speed and decrease the output of filter 26 appropriately. Consequently, amplifier 28 will reduce the current to the stator windings of the spindle motor thereby slowing the motor down.

FIG. 2 also shows a feedforward circuit 32 which is connected between the head position circuit 10 and the speed control circuit 20. More specifically, the input to the feedforward circuit is connected to the output of VCM DAC 12 and the input of amplifier 14. The output of the feedforward circuit 32 is connected to the output of the charge pump 24, the filter 26, and the input to amplifier 28. In operation, the feedforward circuit senses the output of VCM DAC 12 so that any changes in the position of the heads are fed forward to the speed control loop 20. If, for example, the heads 18 are being moved to a position which produce a higher drag, the feedforward circuit 32 increases the voltage at the input to amplifier 28 so that more current is supplied to spindle motor 30 to overcome the additional drag. Conversely, if the head is being moved to a position which has lower drag, the feedforward circuit decreases the voltage at the input to amplifier 28 so that less current is supplied to spindle motor 30. By feeding forward the head position information, speed control loop 20 can compensate for changes in drag due to head position before the motor speed is affected. Consequently, the invention has the advantage of precompensating changes in drag due to head seeks in a disk drive. The invention also has the advantage of anticipating changes in rotational drag due to changes in head position.

Figure 3:
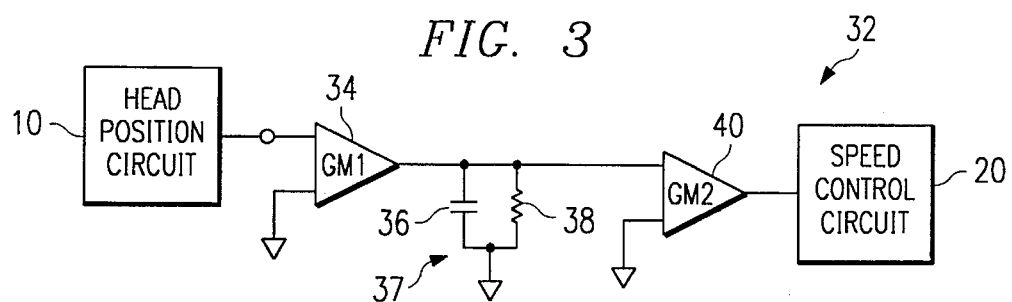
FIG. 3 is a schematic drawing of the feedward circuit disclosed in FIG. 2.

FIG. 3 shows feedforward circuit 32 in more detail. FIG. 3 shows an amplifier 34 having an input connected to the head position circuit 10, having a second input connected to a voltage reference (ground), and having an output connected to a filter 37 and to the input of amplifier 40. The filter 37 includes capacitor 36 in parallel with resistor 38. The second input of amplifier 40 is connected to ground and the output of amplifier 40 is connected to the speed control loop circuit 20. The first amplifier 34 in combination with the capacitor 36 integrates the signal from the head position circuit 10. The second amplifier 40 in combination with the filter 26 of FIG. 2 performs a second integration function on the signal from the head position circuit.

Figure 4:
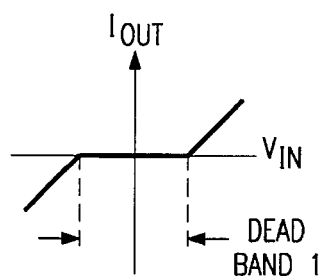
FIG. 4 is the output current to input voltage characteristics of a first deadband amplifier disclosed in FIG. 3.
Figure 5:
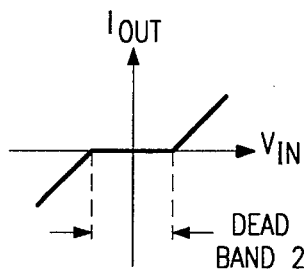
FIG. 5 is the output current to input voltage characteristics of a second deadband amplifier disclosed in FIG. 3.

It has been observed that small changes in the head position can be ignored since the speed control loop will not be significantly affected by them. Therefore, low energy signals from the head position circuit 10 can be ignored. FIG. 4 shows the preferred input voltage to output current characteristics of deadband amplifier 34. The deadband amplifier is preferrably designed to eliminate signals that have low amplitude. Similarly, FIG. 5 shows the preferred input voltage to output current characteristics of deadband amplifier 40. The magnitude of deadband 2 is selected so that it eliminates the integral of the signal which has low amplitude, i.e. the signals that have low energy. It has been observed that a class B deadband amplifier can be used to remove the DC and low energy components and provide the voltage-current characteristics shown in FIGS. 4 and 5.

Figure 6:
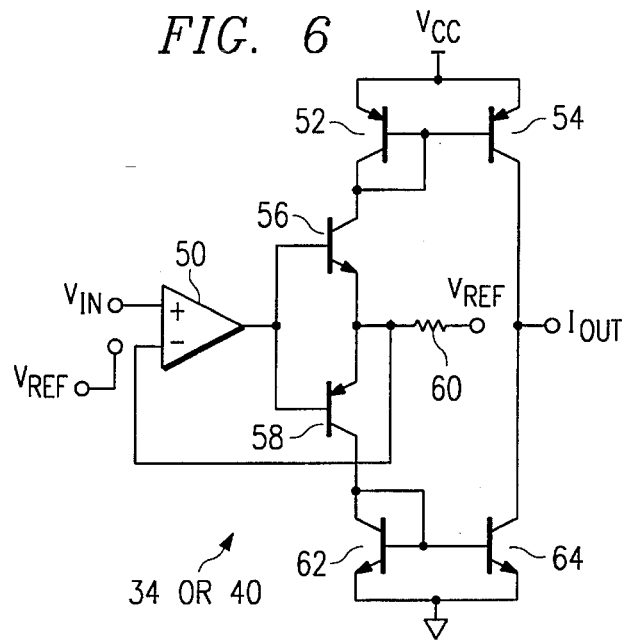
FIG. 6 is a detailed schematic of the preferred embodiment of the deadband disclosed in FIG. 3.

FIG. 6 shows a preferred embodiment of a deadband amplifier 34 or 40. The input voltage Vin is received by the non-inverted input of amplifier 50. The output of amplifier 50 is connected to the base of NPN transistor 56 and the base of PNP transistor 58. The emitter of transistor 56 is connected to the emitter of transistor 58, one end of resistor 60, and the inverting input of amplifier 50. The other end of resistor 60 is connected to a voltage reference, ground. The collector of transistor 56 is connected to the collector and base of PNP transistor 52 and the base of PNP transistor 54. The emitters of transistor 52 and transistor 54 are connected to a Vcc voltage. The collector of transistor 58 is connected to the collector and base of NPN transistor 62 and to the base of NPN transistor 64. The emitters of transistors 62 and 64 are connected to ground. The collectors of transistors 54 and 64 are connected together to form the output of the deadband amplifier 34 or 40.

In operation, the output current of deadband amplifier 34 or 40 is approximately follows the following equation:

$I_{out} = (V_{in} - V_{ref})/R$ where $I_{out}$ = the output current $V_{in}$ = the input voltage $V_{ref}$ = a voltage reference (shown as ground)

R=the resistance of resistor 60

The deadband is controlled by the following equation $V_{DB} = 2V_{be}/A$, where $V_{DB}$=the magnitude of the deadband in volts $V_{be}$=base to emitter threshold voltage for transistors 56 and 58.

A=the gain of amplifier 50.

The method for feeding forward the head motor signal to the speed control loop of the disk drive can be summarized as:

1. positioning a head of a disk drive using a head position circuit having a head control signal;
2. controlling a speed of the spindle motor using a speed control loop circuit having a speed control signal; and
3. feeding forward a head control signal from the head position circuit to the speed control signal of the speed control loop circuit.

The step of feeding forward a head control signal is accomplished by sensing the head control signal; amplifying the head position signal using a deadband amplifier; and then adding the amplified signal to the speed control signal. The amplified signal can be filtered and amplified using a deadband filter to further remove noise and the DC component of the signal in order to obtain a correct precompensation. The signal can be integrated with a class B amplifier, as described above.

Figure 7:
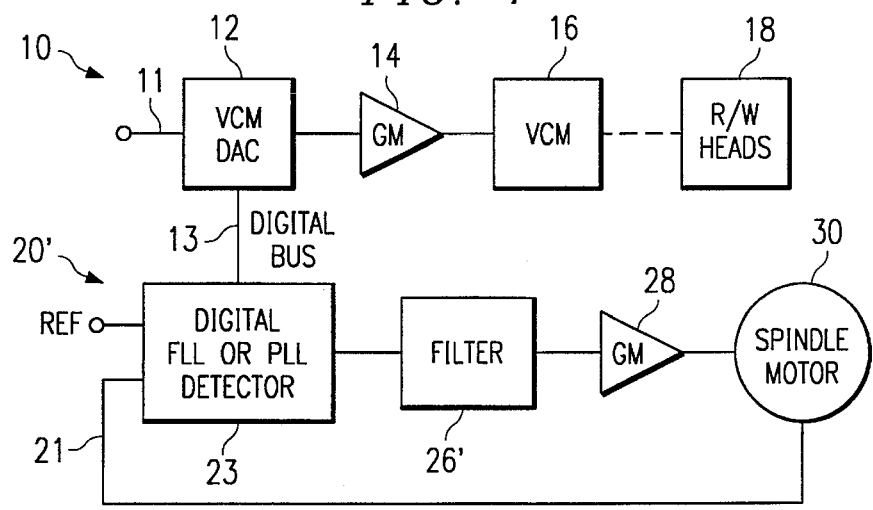
FIG. 7 is a block diagram of a feedforward circuit connecting the head position circuit to a speed control circuit which has a digital FLL or PLL detector circuit in a disk drive.

FIG. 7 shows an alternate embodiment which is very similar to the embodiment in FIG. 2 but is different in that the speed control loop in FIG. 7 uses a digital FLL or PLL detector 23 instead of an analog FLL or PLL detector. Consequently, the feed forward circuit can be a digital bus 13 instead of the feed forward circuit 32 of FIG. 2.

More specifically, FIG. 7 shows the pertinent part of a head positioning circuit 10, which includes a voice coil motor digital to analog converter (VCM DAC) 12 connected to a transconductance amplifier 14, which in turn is connected to a voice coil motor (VCM) 16. The VCM 16 is physically connected to read/write heads 18. In operation, a head position signal is generated by the control unit of the disk drive (not shown) and received by the VCM DAC 12 on line 11. The VCM DAC 12 converts the head position signal into an analog signal which amplifier 14 converts into current for the VCM 16, which is mechanically coupled to the r/w heads 18 of the disk drive. The r/w heads 18 move responsive to the current in the VCM 16, as is known in the art.

FIG. 7 also shows a speed control loop 20' which controls the speed of the spindle motor 30. The speed control loop 20' consists of a digital FLL or PLL detector 23 which has a reference signal input, a feedback loop input, and an output which is connected to an input of a filter 26'. The filter 26' has an output which is connected to an input to amplifier 28. The amplifier 28 has an output which is connected to a spindle motor 30. The spindle motor has a position indicator, such as a zero crossing detector, which is used as a feedback signal. The feedback signal is sent to the FLL or PLL detector 22 via feedback line 21.

In operation, the speed control loop 20' maintains the speed of the spindle motor 30 by comparing the feedback signal on line 21 to the reference signal in the digital FLL or PLL detector 23. From the comparison, an error signal is fed to the filter 26' which integrates the error signal. The integrated error signal is then converted to current by amplifier 28. The output of amplifier 28 is used to drive the stator coils of spindle motor 30. If the spindle motor 30 is running slower than desired, the digital FLL or PLL detector 22 will sense the error and increase the output of filter 26'. This increase is sensed by the amplifier 28 which increases the drive current in spindle motor 30 so that the motor speeds up. Conversely, if the motor is running fast, the digital FLL or PLL detector 22 senses the extra speed and decrease the output of filter 26' appropriately. Consequently, amplifier 28 will reduce the current to the stator windings of the spindle motor thereby slowing the motor down.

FIG. 7 also shows a digital bus circuit 13 which is connected between the head position circuit 10 and the speed control circuit 20'. More specifically, one end of digital bus 13 is connected to VCM DAC 12 and the other end of digital bus 13 is connected to the digital FLL or PLL detector 23. In operation, the digital position signal 11 is fed forward to the digital FLL or PLL detector 23 so that any changes in the position of the heads are fed forward to the speed control loop 20'. If, for example, the heads 18 are being moved to a position which produce a higher drag, the digital FLL detector 23 increases the voltage at the input to amplifier 28 so that more current is supplied to spindle motor 30 to overcome the additional drag. Conversely, if the head is being moved to a position which has lower drag, the digital FLL detector 23 decreases the voltage at the input to amplifier 28 so that less current is supplied to spindle motor 30. By feeding forward the head position information via the digital bus 13, speed control loop 20 can compensate for changes in drag due to head position before the motor speed is affected. Consequently, the invention has the advantage of precompensating changes in drag due to head seeks in a disk drive. The invention also has the advantage of anticipating changes in rotational drag due to changes in head position.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for precompensating the speed control loop of a disk drive, the method comprising the steps of:

positioning a head of the disk drive using a head position circuit having a head control signal;

controlling a speed of a spindle motor in the disk drive using a speed control loop circuit having a speed control signal; and feeding forward said head control signal to the speed control loop signal such that a constant rotational velocity is maintained.

2. The method of claim 1 wherein the step of feeding forward further comprises the steps of:

sensing said head control signal;

integrating said head control signal; and adding said integrated head control signal to speed control loop signal.

3. The method of step 2 wherein the step of integrating said head control signal is performed using a first deadband amplifier.

4. The method of claim 2 wherein the step of integrating said head control signal further comprises:

filtering said integrated head control signal; and integrating said filtered integrated head control signal.

5. The method of claim 4 wherein the step of integrating the filtered integrated head control signal is performed using a second deadband amplifier.

6. The method of claim 1 wherein the feeding forward of the head position signal is performed using a digital signal processor.

7. A circuit for regulating the speed of a spindle motor comprising in a disk drive:

a head position circuit for positioning a plurality of heads in a disk drive;

a speed control loop circuit for controlling the rotational speed of a spindle motor; and a feedforward circuit having an input connected to the head position circuit and having an output connected to the speed control circuit for precompensating the speed control loop circuit responsive to changes in the position of the heads such that the spindle motor maintains a constant velocity.

8. The circuit of claim 7 wherein the feedforward circuit further comprises a first deadband amplifier.

9. The circuit of claim 8 wherein the feedforward circuit further comprises a filter circuit.

10. The circuit of claim 9 wherein the feedforward circuit further comprises a second deadband amplifier.

11. The circuit of claim 8 wherein the first deadband amplifier comprises:

a first NPN transistor having a collector, a base, and an emitter, the base connected to the input of the first deadband amplifier;

a second PNP transistor having a collector, a base connected to the base of the first NPN transistor such that the base of the first transistor and the base of the second transistor are the input to the first deadband amplifier, and an emitter connected to the emitter the first NPN transistor;

a highside current mirror having an input connected to the collector of the first NPN transistor and having an output; and a lowside current mirror having an input connected to the collector of the second PNP transistor and having an output connected to the output of the highside current mirror such that the outputs of the highside and lowside current mirrors are the output of the deadband amplifier.

12. The feedforward circuit of claim 9 wherein the filter circuit comprises a resistor in parallel with a capacitor.

13. The circuit of claim 7 wherein the speed control circuit comprises a digital signal processor; and wherein the feedforward circuit comprises a bus circuit for loading head seek data into the digital signal processor such that the digital signal process uses head seek data to precompensate the speed control loop circuit.

14. A disk drive system comprising:

a means for positioning a plurality of heads in the disk drive;

a means for controlling the rotational speed of a spindle motor in the disk drive; and a feedforward circuit having an input for sensing the means for positioning a plurality of heads and having an output connected to the means for controlling the rotational speed of the spindle motor, such that the feedforward circuit precompensates the means for controlling the rotational speed for changes in drag caused by moving the heads in the disk drive.

15. The disk drive system of claim 14 wherein the feedforward circuit further comprises a first deadband amplifier.

16. The disk drive system of claim 15 wherein the feedforward circuit further comprises a filter circuit.

17. The disk drive system of claim 16 wherein the feedforward circuit further comprises a second deadband amplifier.

18. The disk drive circuit of claim 15 wherein the first deadband amplifier comprises:

a first NPN transistor having a collector, a base, and an emitter, the base connected to the input of the first deadband amplifier;

a second PNP transistor having a collector, a base connected to the base of the first NPN transistor such that the base of the first transistor and the base of the second transistor are the input to the first deadband amplifier, and an emitter connected to the emitter the first NPN transistor;

a highside current mirror having an input connected to the collector of the first NPN transistor and having an output; and a lowside current mirror having an input connected to the collector of the second PNP transistor and having an output connected to the output of the highside current mirror such that the outputs of the highside and lowside current mirrors are the output of the deadband amplifier.

19. The disk drive system of claim 16 wherein the filter circuit comprises a resistor in parallel with a capacitor.

20. The disk drive system of claim 14 wherein means for controlling the rotational speed includes a digital signal processor and the feedforward circuit comprises a bus circuit for loading head position signal into the digital signal processor such that the digital signal precompensates the means for controlling the rotational speed.

* * * * *